(12) United States Patent
Nakano

(10) Patent No.: US 9,703,499 B2
(45) Date of Patent: Jul. 11, 2017

(54) COMMUNICATION DEVICE, RFID SYSTEM, AND RECORDABLE MEDIUM HAVING DATA WRITING PROGRAM RECORDED THEREON

(71) Applicant: OMRON Corporation, Kyoto-shi, Kyoto (JP)

(72) Inventor: Yoshimitsu Nakano, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 27 days.

(21) Appl. No.: 14/763,179

(22) PCT Filed: Jan. 29, 2014

(86) PCT No.: PCT/JP2014/051898
§ 371 (c)(1),
(2) Date: Jul. 24, 2015

(87) PCT Pub. No.: WO2014/119591
PCT Pub. Date: Aug. 7, 2014

(65) Prior Publication Data
US 2015/0363130 A1 Dec. 17, 2015

(30) Foreign Application Priority Data
Jan. 29, 2013 (JP) ................. 2013-014254

(51) Int. Cl.
*G06F 3/06* (2006.01)
*G06F 12/16* (2006.01)
*G06F 11/07* (2006.01)
*G06F 11/14* (2006.01)
*H04W 4/00* (2009.01)

(52) U.S. Cl.
CPC ............ *G06F 3/0619* (2013.01); *G06F 3/064* (2013.01); *G06F 3/065* (2013.01); *G06F 3/0679* (2013.01); *G06F 11/0766* (2013.01); *G06F 11/1402* (2013.01); *G06F 12/16* (2013.01); *H04W 4/008* (2013.01)

(58) Field of Classification Search
CPC ...... G06F 3/0679; G06F 3/0619; G06F 3/065; G06F 3/064; G06F 11/0766; G06F 11/1402; G06F 12/16
USPC ......................................... 711/103
See application file for complete search history.

(56) References Cited

U.S. PATENT DOCUMENTS 8,028,145 B2 * 9/2011 Fukada .................. G01D 9/005
711/103

FOREIGN PATENT DOCUMENTS

| JP | 2001-022653 A | 1/2001 |
| JP | 4300255 B2 | 5/2009 |

* cited by examiner

*Primary Examiner* — Jasmine Song
(74) *Attorney, Agent, or Firm* — Mots Law, PLLC

(57) ABSTRACT

A communication device (3) performs contactless communication with an RF tag (8) that is provided with a nonvolatile memory (82) having a plurality of blocks serving as units of data erasure. The communication device (3) includes a specifying unit (303) that specifies, from among blocks to which a writing range belongs, a divided block that includes data outside the writing range when data is written into the nonvolatile memory, a backup processing unit (304) that backs up original data of the specified divided block, a storage unit (36) that stores backup data that includes the original data, and a writing processing unit (305) that writes the update data into the divided block that was initialized when the backup data is stored.

20 Claims, 10 Drawing Sheets

| | Communication time and date | Tag ID | Address/size | Data |
|---|---|---|---|---|
| R1 | 9/12 ;12:00:59 | AAAA | 0x0010/4byte | 0x11111111 |
| R2 | 9/30 ;13:03:28 | BBBB | 0x0020/8byte | 0x222222222222··· |
| R3 | 10/3 ;1:00:59 | CCCC | 0x0010/8byte | 0x333333333333··· |
| R4 | 12/18 ;8:00:59 | DDDD | 0x0030/4byte | 0x44444444 |
| R5 | 12/25 ;12:00:59 | EEEE | 0x0030/8byte | 0x555555555555··· |
| ⋮ | | | | ⋮ | ic # COMMUNICATION DEVICE, RFID SYSTEM, AND RECORDABLE MEDIUM HAVING DATA WRITING PROGRAM RECORDED THEREON

TECHNICAL FIELD

The present invention relates to a communication device, an RFID (Radio Frequency IDentification) system, and a recording medium having a data writing program recorded thereon, and particularly relates to a communication device that performs contactless communication with an RFID tag (hereinafter, referred to as "RF tag") that is provided with a nonvolatile memory having a plurality of blocks serving as units of data erasure, to an RFID system including the communication device and the RF tag, and to a recording medium having recorded thereon a data writing program that is executed by the communication device.

RELATED ART

In recent years, in various fields, information management using RF tags is conducted. A commonly-used RFID system includes an RF tag that is attached to an article to be managed or an object (such as a pallet or container) that supports or accommodates the article, a reader/writer that serves as a communication device for performing communication processing with the RF tag, and a host device that controls the reader/writer. The reader/writer performs reading and writing of data from and into the nonvolatile memory in the RF tag in accordance with a command from the host device, and sends the processing result back to the host device.

Because the reader/writer performs contactless communication with the RF tag, there may be cases where the communication is interrupted while data is rewritten. JP 2001-22653A (Patent Document 1) discloses a configuration that backs up data on the RF tag side in order to prevent such a situation.

With regard to the data backup, JP 4300255B (Patent Document 2) discloses that an RF tag including a module for communicating with a wireless base station automatically detects the interruption of the communication with the reader/writer and performs backup communication with the wireless base station.

RELATED ART DOCUMENTS

Patent Documents

Patent Document 1: JP 2001-22653A
Patent Document 2: JP 4300255B

SUMMARY OF THE INVENTION

Problem to be Solved by the Invention

Commonly, an RF tag is provided with a nonvolatile memory such as a flash memory in which data is to be erased in units of a block (i.e. block by block). Therefore, if data is written into such a nonvolatile memory, even when data is written only into a part of a block, initialization (data erasure) of the entire block, serving as a writing destination, is first performed and then update data is written. Accordingly, if the communication is interrupted during the writing of data into the RF tag due to some sort of reason (for example, when the RF tag moves to a region in which it cannot be supplied with an operating electric power or the like), there is a risk that the original data of the block serving as a writing destination is lost.

Since the above-described conventional backup methods require changing hardware configuration of the RF tag or the environment of the system, realization thereof is expensive.

The present invention was made in order to solve the foregoing problems, and it is an object thereof to provide a communication device, an RFID system, and a recording medium having a data writing program recorded thereon that can prevent a complete data loss by a simple method.

Means for Solving the Problems

According to an aspect of the present invention relates to a communication device that performs contactless communication with an RF tag that is provided with a nonvolatile memory having a plurality of blocks serving as units of data erasure, including: a specifying unit that specifies, from among blocks to which a writing range belongs, a block that includes data outside the writing range when data is written into the nonvolatile memory; a backup processing unit that backs up original data of the block specified by the specifying unit; a storage unit that stores backup data that includes the original data; and a writing processing unit that writes, when the backup data is stored in the storage unit, update data into the block that was specified and initialized.

It is preferable that the original data included in the backup data be data that is read by the writing processing unit from the specified block before the initialization.

It is preferable that the communication device further include: a writing-back processing unit that reads the backup data stored in the storage unit and writes the original data back into the specified block of the nonvolatile memory, if writing into the specified block has failed.

It is preferable that the communication device further include: a notification unit that performs, if writing into the specified block has failed, notification of error information indicating a possibility of a data loss, wherein the writing-back processing unit writes the original data back into the specified block in response to a writing-back instruction from a user.

It is preferable that the communication device further include: an electric power supply unit, wherein the storage unit further stores predetermined information during writing processing by the writing processing unit, the notification unit further performs, when the electric power supply unit is turned on, notification of the error information if the predetermined information is stored in the storage unit.

It is preferable that the notification unit perform notification of the error information such that a data loss caused by a communication failure and a data loss caused by an electric power interruption are distinguished from each other.

It is preferable that the notification unit transmit the error information to a host device connected by a cable or wireless connection.

It is preferable that the communication device further include: a detection unit that detects the RF tag, and acquires identification information of the detected RF tag, wherein the backup processing unit stores the identification information of the RF tag and the backup data in association with each other, and the writing-back processing unit writes the original data back into the specified block in response to a writing-back instruction, if the identification information of the detected RF tag and the identification information associated with the backup data match each other.

According to another aspect of the present invention relates to an RFID system including the communication device having any one of the above-described features, and the RF tag.

According to a further aspect of the present invention relates to a recording medium having a data writing program for writing data into a nonvolatile memory of an RFID tag recorded thereon, the nonvolatile memory having a plurality of blocks serving as units of data erasure, the data writing program being executed by a communication device that performs contactless communication with the RF tag. The data writing program includes the steps of specifying, from among blocks to which a writing range belongs, a block that includes data outside the writing range when data is written into the nonvolatile memory; storing backup data that includes original data of the specified block into a storage unit; and writing, when the backup data is stored in the storage unit, update data into the block that was specified and initialized.

Effects of the Invention

According to the present invention, it is possible to prevent a complete data loss by a simple method.

EMDODIMENTS OF THE INVENTION

Figure 1:
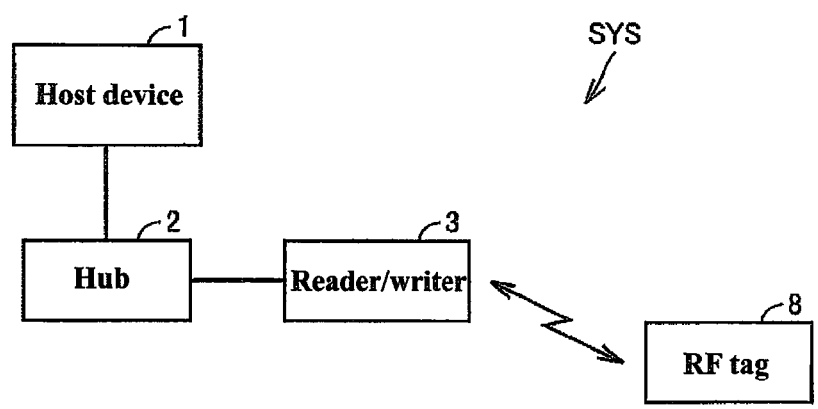
FIG. 1 is a diagram schematically illustrating a configuration of an RFID system according to an embodiment of the present invention.

Hereinafter, an embodiment of the present invention will be described in detail with reference to the drawings. Note that the same reference numerals are given to the same or equivalent parts in the drawings, and descriptions thereof are not repeated.

An RFID system according to the present embodiment is used, for example, in a production line of a factory and the like so as to manage information on workpieces that are conveyed on a conveying path.

<About Configuration>

Schematic System Configuration

First, a schematic configuration of the RFID system according to the present embodiment will be described.

FIG. 1 is a diagram schematically illustrating a configuration of an RFID system SYS according to the embodiment of the present invention. As shown in FIG. 1, the RFID system SYS includes a host device 1, a reader/writer 3, which serves as a communication device, and an RF tag 8.

The host device 1 is a control device that performs overall control of reading/writing of information from/into the RF tag 8. The host device 1 is realized by, for example, a personal computer or a PLC (Programmable Logic Controller). The host device 1 is connected to the reader/writer 3 via a hub 2, and communicates with the reader/writer 3. The hub 2 is, for example, an Ethernet (registered trademark) hub. The reader/writer 3 executes communication with the RF tag 8 and reading/writing of information from/into the RF tag 8, in accordance with a command from the host device 1. Note that although in the present embodiment, the host device 1 and the reader/writer 3 are assumed to be connected to each other by a cable connection, they may be connected to each other by a wireless connection.

Here, there is a case where on a conveying path, the position of the RF tag 8 changes due to rotation of a pallet or a container while the reader/writer 3 and the RF tag 8 communicate with each other. There is also a case where the conveying speed of a workpiece during the communication is not appropriate. In cases like these, communication may be interrupted while data is written into the RF tag 8. If the RF tag 8 is provided with, for example, a flash memory, the original data is erased (initialization) in units of a block before data is written. Accordingly, if communication is interrupted after the erasure, the original data will be lost. If data of the entire block is to be rewritten, a user needs only to write new data (udate data) again, and thus even a loss of the original data does not pose a problem. In contrast, if data is to be written only into a part of a block, a loss of the original data is disadvantageous because the original data of the block is also needed. In the present embodiment, therefore, only the original data of a block a part of which data is to be written into is backed up in the reader/writer 3.

Hardware Configurations of Devices

Hereinafter, examples of hardware configurations of the devices included in the RFID system SYS will be described.

Figure 2:
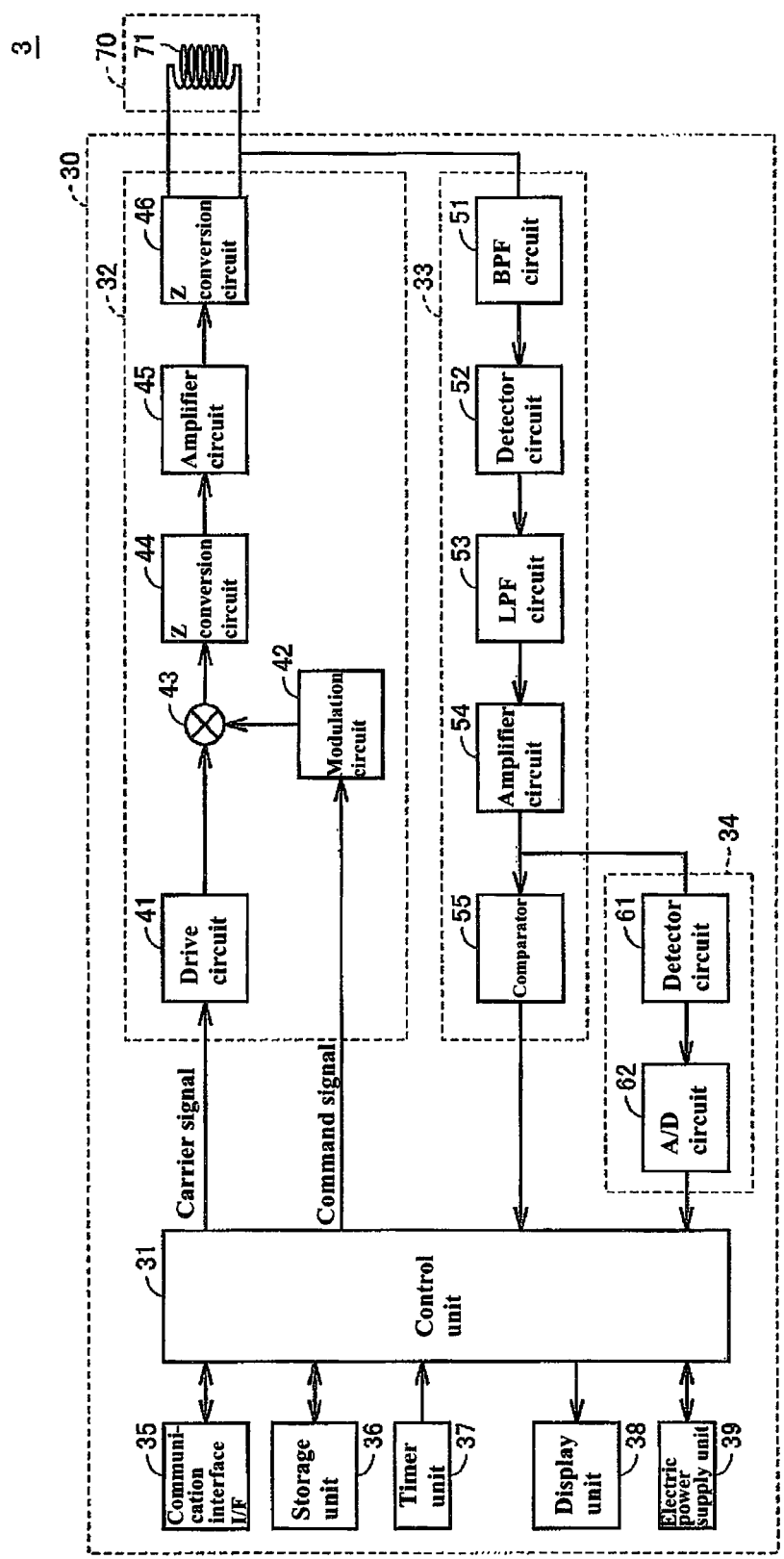
FIG. 2 is a block diagram illustrating a hardware configuration of a reader/writer according to the embodiment of the present invention.
Figure 3:
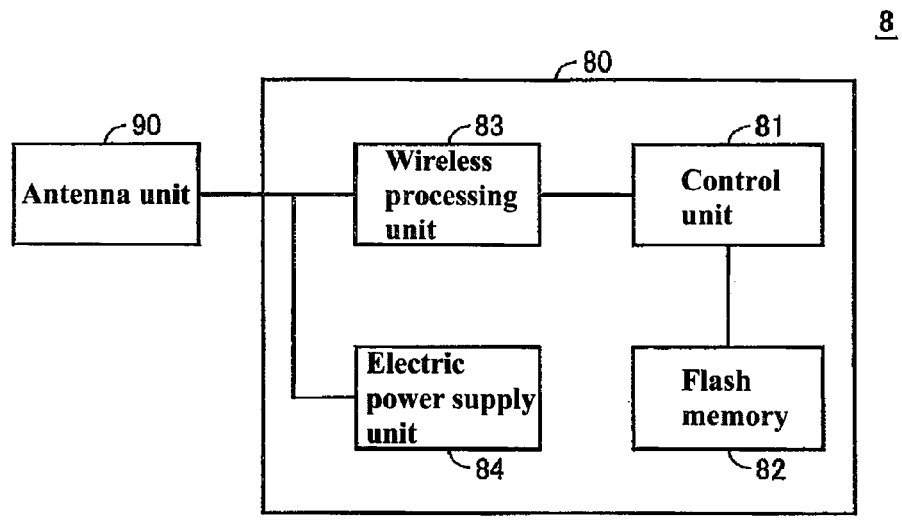
FIG. 3 is a block diagram illustrating a hardware configuration of an RF tag according to the embodiment of the present invention.

FIG. 2 is a block diagram illustrating a hardware configuration of the reader/writer 3 according to the embodiment of the present invention. FIG. 3 is a block diagram illustrating a hardware configuration of the RF tag 8 according to the embodiment of the present invention.

As shown in FIG. 2, the reader/writer 3 is constituted by an antenna unit 70 including an antenna coil 71, and a communication control device 30 including a control unit 31. Note that this configuration is merely an example, and the antenna unit 70 and the communication control device 30 may also be formed in one piece.

The communication control device 30 includes, in addition to the control unit 31, a transmitting circuit 32, a receiving circuit 33, a reception level detecting circuit 34, a communication interface (I/F) 35, a storage unit 36, a timer unit 37, a display unit 38, and an electric power supply unit 39.

The control unit 31 is realized by an arithmetic processing unit such as a CPU (Central Processing Unit). An Ethernet (registered trademark) cable is connected to the communication I/F 35, and transmission/reception of information to/from the host device 1 is performed. The storage unit 36 stores various types of programs and data in a nonvolatile manner. The storage unit 36 may be, for example, a flash memory. The timer unit 37 measures a time, and outputs measured time data to the control unit 31. The display unit 38 displays various types of information in accordance with an instruction from the control unit 31. The display unit 38 may be configured by LED (Light Emitting Diode) lamps.

The transmitting circuit 32 is constituted by a drive circuit 41, a modulation circuit 42, a multiplication circuit 43, an amplifier circuit 45, and a pair of Z conversion circuits 44 and 46 that sandwich the amplifier circuit. The receiving circuit 33 is constituted by a band-pass filter (BPF) circuit 51, a detector circuit 52, a low-pass filter (LPF) circuit 53, an amplifier circuit 54, a comparator 55, and the like. The reception level detecting circuit 34 is constituted by a detector circuit 61 and an A/D (Analog to Digital) conversion circuit 62.

Note that the communication control device 30 is assumed to include an oscillator circuit (not shown) that outputs a high-frequency pulse, which serves as a carrier signal.

In the above-described configuration, the control unit 31 outputs, based on a pulse signal from the oscillator circuit (not shown), a high-frequency pulse (hereinafter, referred to as a "carrier signal"), which serves as the origin of a carrier wave. Furthermore, the control unit 31 suitably outputs a command signal of a given bit number. The carrier signal, after having been converted into the carrier wave by the drive circuit 41, is subjected to impedance matching processing performed by the Z conversion circuits 44 and 46 and to amplification processing performed by the amplifier circuit 45, so as to be supplied to the antenna coil 71 and transmitted outward as an electromagnetic wave. Furthermore, by the modulation circuit 42 and the multiplication circuit 43 modulating the amplitude of the carrier wave in accordance with the command signal, the command signal is superimposed on the carrier wave.

When the electromagnetic wave is transmitted outward from the antenna coil 71 in the above-described processing, an induced electromotive force is generated in the RF tag 8 present in a communication region due to this electromagnetic wave, and a control unit 81 (FIG. 3) on the RF tag 8 side is activated. If in this situation, a command signal is transmitted from the antenna coil 71, the control unit 81 of the RF tag 8 deciphers the command indicated by the command signal to execute the instructed processing, then generates a signal (response signal) indicating predetermined response data, and transmits the generated signal back to the reader/writer 3.

In the receiving circuit 33, the band-pass filter circuit 51 performs noise removal, and then the detector circuit 52 extracts a carrier wave including the response signal. Furthermore, the low-pass filter circuit 53 extracts the response signal of the tag 8 from the carrier wave, the amplifier circuit 54 amplifies the extracted response signal, and then the comparator 55 converts the amplified response signal into a rectangular signal. Using the signal input by the comparator 55, the control unit 31 deciphers the content of the response of the tag 8, and outputs communication result data including this deciphered data to the communication I/F 35.

The detector circuit 61 of the reception level detecting circuit 34 receives an input of the same response signal as the signal that is input to the comparator 55, and generates an envelope signal indicating changes in the levels of peaks of the response signal. The A/D conversion circuit 62 converts this envelope signal into a digital signal. The digital data obtained by this conversion is input to the control unit 31 as a reception level of the response signal.

As shown in FIG. 3, the RF tag 8 includes an antenna unit 90 and a wireless communication IC (wireless communication device) 80. The RF tag 8 of this type may be, for example, a passive type tag or an active type tag.

The antenna unit 90 converts electric waves received from the reader/writer 3 into wireless signals so as to transmit the wireless signals to the wireless communication IC 80, and converts wireless signals from the wireless communication IC 80 into electric waves so as to transmit the electric waves to the reader/writer 3. The antenna unit 90 includes an antenna coil (not shown).

Based on a signal received from the reader/writer 3 via the antenna unit 80, the wireless communication IC 80 stores data from the reader/writer 3 or transmits stored data to the reader/writer 3 via the antenna unit 80. This wireless communication IC 80 includes, as shown in FIG. 3, the control unit 81, a flash memory 82, a wireless processing unit 83, and an electric power supply unit 84.

The control unit 81 performs overall control of the operations of the units of the wireless communication IC 80. The control unit 81 includes a logic operation circuit, a register, and the like, and functions as a computer. As described above, the flash memory 82 is a nonvolatile memory having a plurality of blocks serving as units of erasure. The flash memory 82 stores programs and data.

The wireless processing unit 83 converts wireless signals received from the outside via the antenna unit 90 into their original form so as to transmit the converted data to the control unit 81, and converts data received from the control unit 81 into a form suitable for wireless transmission so as to transmit the converted wireless signal to the outside via the antenna unit 90. In the wireless processing unit 83, for example, an A/D (Analog to Digital) conversion circuit, a D/A (Digital to Analog) conversion circuit, a modulation and demodulation circuit, an RF circuit, and the like are used.

The electric power supply unit 84 rectifies the inductive voltage that is generated by the antenna unit 90 receiving an electric wave in a rectifier circuit so as to regulate the inductive voltage to a predetermined voltage in an electric power supply circuit, and then supplies the regulated voltage to the units of the wireless communication IC 80.

Based on the command signal received from the reader/writer 3 via the antenna unit 90 and the wireless processing unit 83, the control unit 81 stores the data received from the reader/writer 3 into the flash memory 82, or reads data stored in the flash memory 82 so as to transmit the read data to the reader/writer 3 via the wireless processing unit 83 and the antenna unit 90.

Figure 4:
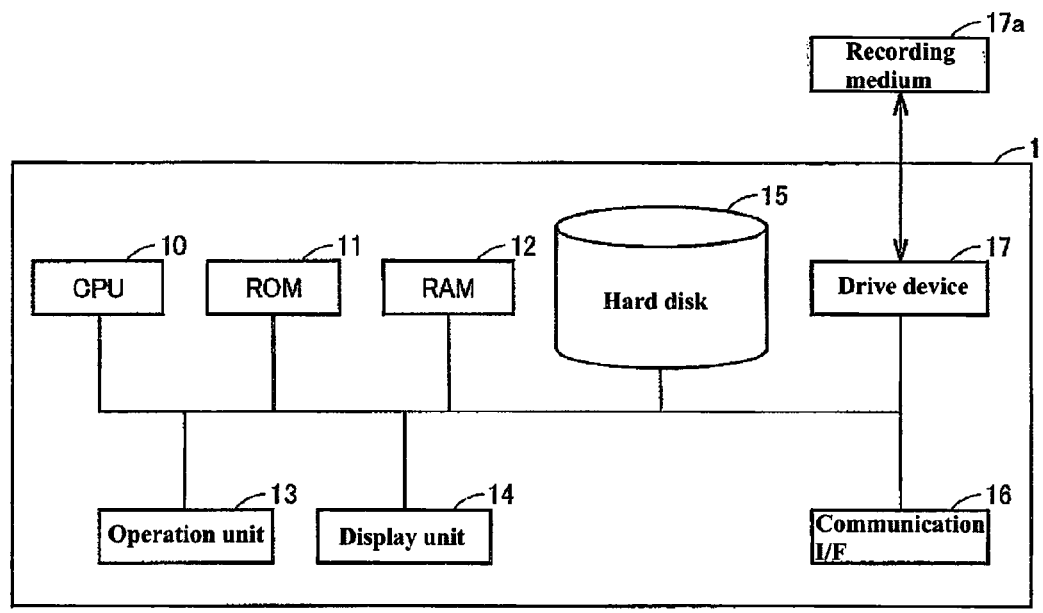
FIG. 4 is a block diagram illustrating an example of a hardware configuration of a host device according to the embodiment of the present invention.

FIG. 4 is a block diagram illustrating an example of a hardware configuration of the host device 1 according to the embodiment of the present invention. FIG. 4 shows a hardware configuration of the host device 1 that is a general-purpose personal computer.

The host device 1 includes a CPU 10 for executing various types of calculation processing, a ROM 11 in which various types of data and programs are stored, a RAM 12 in which operation data and the like are stored, an operation unit 13 for accepting instructions from the user, a display unit 14 for displaying various types of information, a hard disk 15 in which various types of data and programs are recorded, a communication I/F 16 for performing communication with the reader/writer 3 is performed, and a drive device 17 capable of reading/writing data and programs from/into a recording medium 17a. The recording medium 17a may be, for example, an optical medium such as a CD-ROM (Compact Disc-ROM), a memory card, or the like.

Functional Configuration

The following will describe a functional configuration of the RFID system SYS according to the present embodiment.

Figure 5:
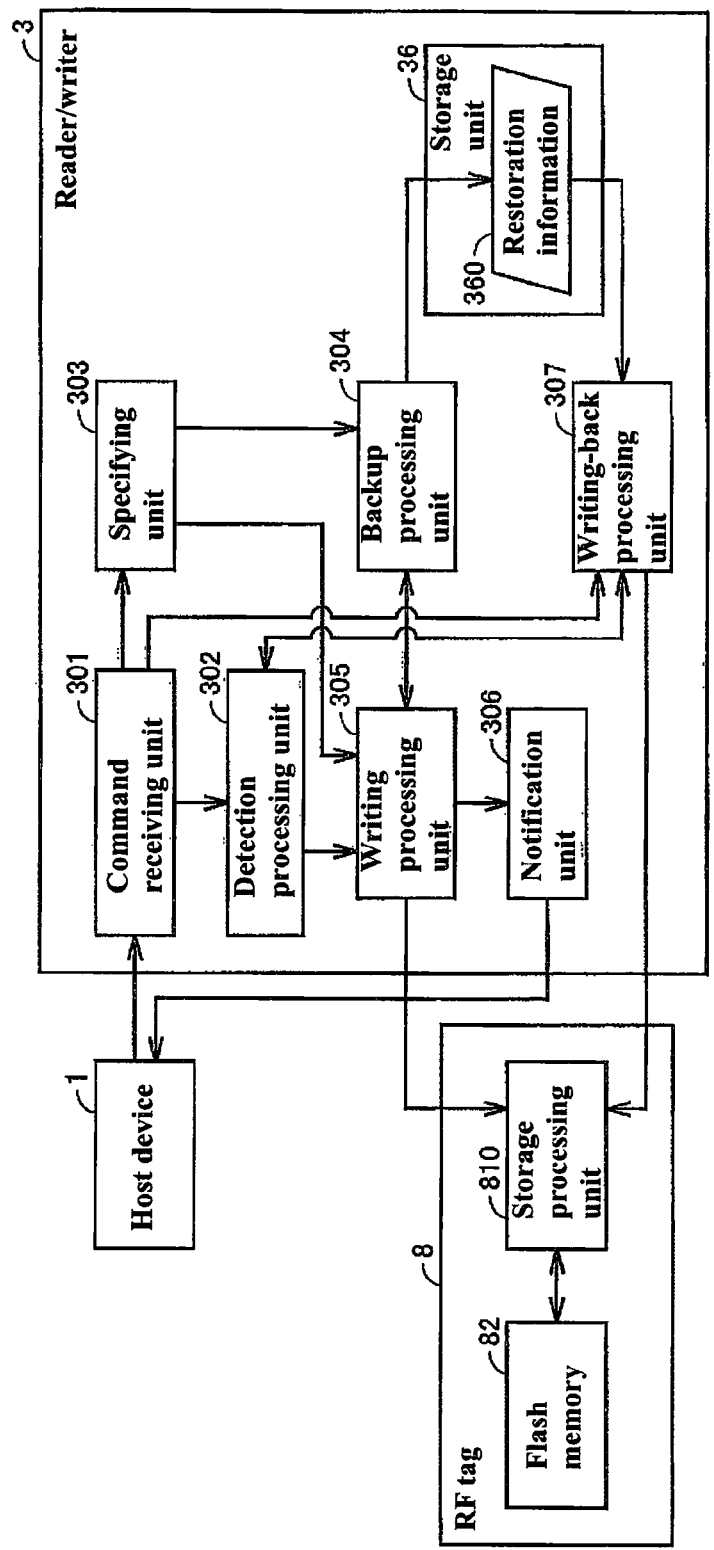
FIG. 5 is a functional block diagram illustrating a functional configuration of the RFID system according to the embodiment of the present invention.

FIG. 5 is a functional block diagram illustrating a functional configuration of the RFID system SYS according to the embodiment of the present invention. As shown in FIG. 5, the reader/writer 3 includes, as its functions, a command receiving unit 301, a detection processing unit 302, a specifying unit 303, a backup processing unit 304, a writing processing unit 305, a notification unit 306, and a writing-back processing unit 307. Furthermore, the RF tag 8 includes, as its function, a storage processing unit 810 that controls reading/writing of data from/into the flash memory 82.

The command receiving unit 301 of the reader/writer 3 receives commands from the host device 1. In the present embodiment, commands transmitted from the host device 1 encompass a writing command and a restoration command. The writing command includes, for example, identification information (hereinafter, referred to as "tag ID") for the RF tag 8, and address information of the flash memory 82 that indicates a writing range. The command receiving unit 301 is realized by the communication I/F 35.

When the command receiving unit 301 has received the above-described command, that is, a writing command and a restoration command, the detection processing unit 302 executes detection processing for detecting the RF tag 8. Furthermore, the detection processing unit 302 acquires the tag ID of the detected RF tag 8. The tag ID is stored in, for example, the flash memory 82 of the RF tag 8.

Upon reception of a writing command by the command receiving unit 301, the specifying unit 303 specifies, from among blocks to which the writing range belongs, the block that includes data outside the writing range. Hereinafter, the processing of the specifying unit 303 will specifically be described with reference to FIG. 6.

Figures 6, 7:
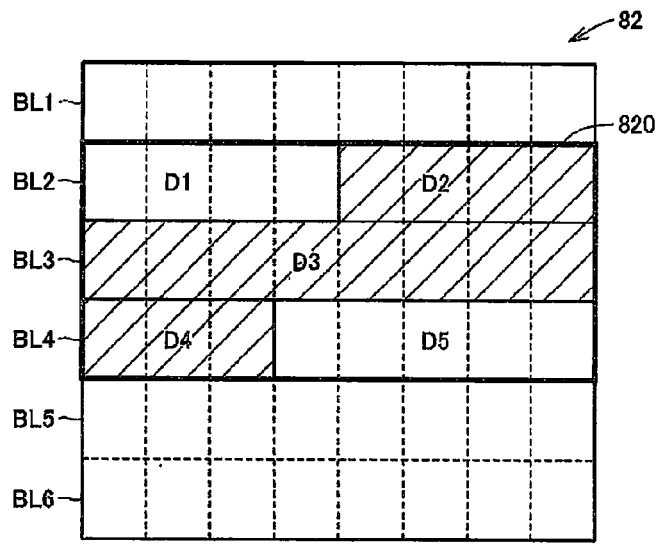
FIG. 6 is a diagram schematically illustrating the relationship between a writing range and the block configuration of a flash memory provided in the RF tag according to the embodiment of the present invention.
FIG. 7 is a diagram illustrating an example of a data structure of restoration information according to the embodiment of the present invention.

FIG. 6 is a diagram schematically illustrating the relationship between a writing range and the block configuration of the flash memory 82 provided in the RF tag 8 according to the embodiment of the present invention. As shown in FIG. 6, the flash memory 82 includes, for example, a plurality of blocks BL1, BL2, . . . , BL6. Each block is constituted by a plurality of bytes. For example, when a new data string denoted by data D2, D3, and D4 is written into the flash memory 82, the writing range corresponds to a hatched area of FIG. 6. More specifically, the writing range is the area bounded by a starting address and an ending address of this data string. The new data D2 is written into a partial area of the block BL2, the new data D3 is written into the entire area of the block BL3, and the new data D4 is written into a partial area of the block BL4. Since, in this case, blocks 820 to which the writing range belongs are the blocks BL2 to BL4, the specifying unit 303 specifies, from among the blocks BL2 to BL4, the blocks BL2 and BL4 as such blocks that include data outside the writing range. These blocks BL2 and BL4 are blocks having the possibility of a data loss due to erasure of data outside the writing range. This is because both original data D1, which is located outside the writing range, in the block BL2, and original data D5, which is located outside the writing range, in the block BL4 are first erased before writing of data by the writing processing unit 305, which will be described later. In the present embodiment, the data that is written in units of a block after initialization of a block is referred to as "update data". For example, in the case of the block BL2, the original data D1 and the new data D2 are collectively referred to as update data.

Note that these blocks are hereinafter referred to as "divided blocks", because data is written only into a part thereof. Furthermore, another block included in the writing range is referred to as a "normal block". When the writing range extends over a plurality of blocks, the divided blocks are the block at the start and the block at the end. When the writing range belongs only to a single block and this block is assumed to be defined also as the block at the start, the divided block is this block at the start. Note that, although it is rarely the case, it is conceivable that data is to be written into the entire blocks even if these blocks serve as the block at the start and as the block at the end. In this case, however, by defining the block at the start and the block at the end as divided blocks, it is possible to simplify the processing. Note that processing for extracting, from among the block at the start and the block at the end, only the block that actually includes data outside the writing range may also be performed.

As shown again in FIG. 5, the backup processing unit 304 performs processing for backing up original data in the divided blocks. The original data to be backed up is the entire data of the divided blocks. Note that only data outside the writing range may be backed up since the original data in the writing range is rewritten to new data. The backup processing unit 304 stores backup data including the original data and address information of the original data, as restoration information 360 in the storage unit 36. The backup data is stored in association with the tag ID acquired by the detection processing unit 302. The restoration information 360 is needed at the time of writing-back of the original data. An example of a data structure of the restoration information 360 will be described later.

The writing processing unit 305 executes processing for writing new data (update data) into the flash memory 82 of the RF tag 8 in response to a writing command received by the command receiving unit 301. In the case of writing into a normal block, new data (update data) is written into the initialized normal block without reading the data from the normal block. For example, when data is written into the block BL3 of FIG. 6, the entire data of the block BL3 is rewritten to the new data D3. The initialization of the normal block is performed on the storage processing unit 810 side of the RF tag 8 before writing of the new data when, for example, a writing command is transmitted from the writing processing unit 305. The writing command transmitted from the reader/writer 3 to the RF tag 8 includes, for example, the new data D3 and address information of the flash memory 82. Note that the writing processing unit 305 may give a block initialization instruction and an update data writing instruction, separately.

On the other hand, in the case of writing of data into a divided block, the writing processing unit 305 writes the update data into the initialized divided block after the backup data is stored in the storage unit 36. For example, when data is written into the block BL2 of FIG. 6, the entire original data of the block BL2 is first read out. Then, update data that is obtained by merging the read entire data and the new data D2 is written into the initialized block BL2. Accordingly, the original data D1 outside the writing range is written back again to the same position. In order to read out the original data of the block BL2, the writing processing unit 305 needs only to transmit a reading command to the RF tag 8. This reading command includes, for example, address information of the flash memory 82. By the storage processing unit 810 of the RF tag 8 reading the entire data from the block BL2 of the flash memory 82 based on the received reading command and sending back the read data, it is possible for the writing processing unit 305 to acquire the original data of the divided block. Note that initialization of the divided block as well may be performed by the same procedure as that in the above-described case of the normal block.

Since, as described above, the writing processing unit 305 first reads the entire data of the divided block, it is advantageous that the backup processing unit 304 backs up the data of the divided block read by the writing processing unit 305, in view of efficiency.

The notification unit 306 performs notification of error information if rewriting of data of divided and normal blocks has failed. Particularly, if rewriting of data of the divided block has failed, notification of error information indicating a possible data loss is performed. In the present embodiment, the notification unit 306 notifies the host device 1 of the error information as a writing result. In this case, the notification unit 306 is realized by, for example, the communication I/F 35. Note that the notification unit 306 may be realized by its display unit 38 because it is sufficient for the user to be notified of the data loss. For example, the user may be notified of the data loss by the display unit 38 lighting in a predetermined color.

The writing-back processing unit 307 reads back up data stored as the restoration information 360 in the storage unit 36 if the writing into a divided block has failed. The entire original data is written back into the divided block whose data was lost.

Note that in the functional configuration of the reader/writer 3 shown in FIG. 5, the functions of the detection processing unit 302, the specifying unit 303, the backup processing unit 304, and the writing processing unit 305 may be realized by the control unit 31 shown in FIG. 2 executing software. It is also possible that at least one of the functions is realized by hardware. Alternatively, the function of the storage processing unit 810 of the RF tag 8 may be realized by the control unit 81.

Example of Data Structure

FIG. 7 is a diagram illustrating an example of a data structure of the restoration information 360 according to the embodiment of the present invention. As shown in FIG. 7, the restoration information 360 includes a plurality of pieces of restoration data R1, R2, . . . Each piece of restoration data includes communication time and date, a tag ID, address information, and original data. The communication time and date may be, for example, the time and date at which the tag 8 was detected by the detection processing unit 302, or the time and date at which the original data was read. The tag ID is the identification information of the tag 8 that was acquired by the detection processing unit 302. As the address information, for example, a starting address and a byte count (size) are stored. The original data is the entire data of a divided block that was read by the writing processing unit 305. Accordingly, in the present embodiment, the address information and the original data, which constitutes the backup data, are stored in association with the communication time and date and the tag ID. As long as the backup data is associated with the communication time and date and the tag ID, a configuration in which all these items are included in one restoration data is not essential.

<About Operation>

Hereinafter, the operation of the RFID system SYS according to the present embodiment will specifically be described.

Data Writing Processing

Figure 8:
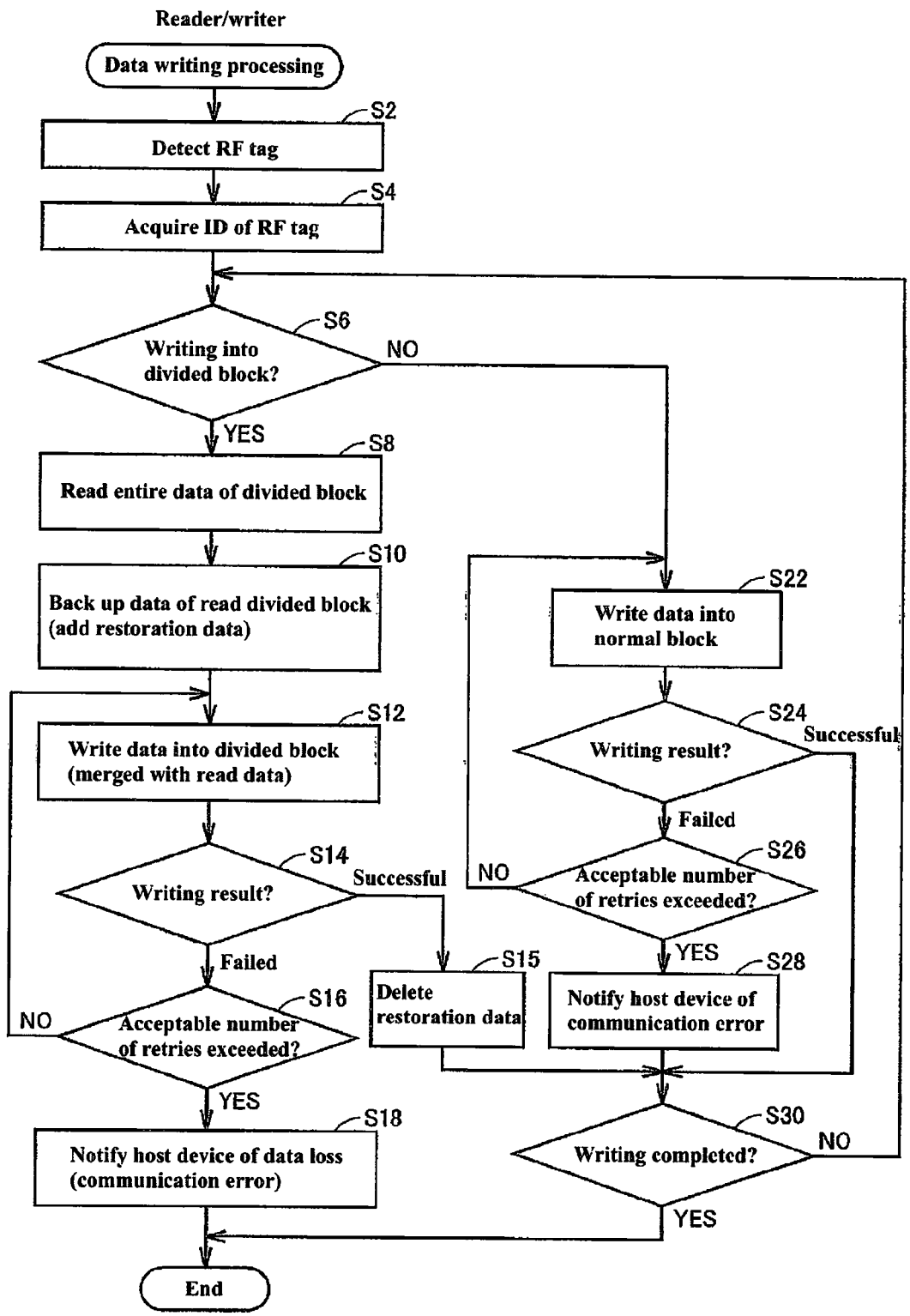
FIG. 8 is a flowchart illustrating data writing processing that is executed by the reader/writer according to the embodiment of the present invention.

FIG. 8 is a flowchart illustrating data writing processing that is performed by the reader/writer 3 according to the embodiment of the present invention. Note that the processing procedure shown in FIG. 8 is stored in advance as a program in the storage unit 36, and the data writing processing is realized by the control unit 31 reading and executing the program. Furthermore, the data writing processing starts when the writing command from the host device 1 is received by the command receiving unit 301.

As shown in FIG. 8, the detection processing unit 302 first executes processing for detecting the RF tag 8 (step S (hereinafter, abbreviated as "S") 2). When the RF tag 8 is detected, the tag ID of the RF tag 8 is acquired (S4).

The specifying unit 303 determines, based on the address information included in the writing command, whether or not a writing destination block is a divided block (S6). The writing destination block is one of one or more blocks to which the writing range belongs. In the present embodiment, the block at the start and the block at the end are determined as divided blocks.

If it is determined that the writing destination block is a divided block (YES in S6), the writing processing unit 305 reads the entire data of the divided block (S8). After this processing, the writing processing unit 305 notifies the backup processing unit 304 of the completion of reading. On the other hand, if it is determined that the writing destination block is not a divided block (NO in S6), the procedure advances to S22.

After the processing in S8, the backup processing unit 304 copies the entire data of the read divided block and backs up the entire data (S10). That is, new restoration data is added to the storage unit 36 so that the restoration information 360 is updated. This restoration data includes, as shown in FIG. 7, the entire data (original data) read as backup data in S8 and its address information, the data on the time and date at which the RF tag 8 was detected in S2, and the tag ID acquired in S4.

When the backup processing is completed, the backup processing unit 304 notifies the writing processing unit 305 of the completion of backup. Accordingly, the writing processing unit 305 transmits a writing command to the RF tag 8 so as to execute processing for rewriting the data of the divided block. Specifically, the writing processing unit 305 merges the data of the divided block that was read in S8 and new data, and writes the merged update data into the initialized divided block (S12). Since here, on the RF tag 8 side, the block is initialized only after a writing command is received, the original data of a divided block cannot fail to be backed up before the initialization thereof, according to the present embodiment. When the writing of the received data into the divided block of the flash memory 82 is completed, the storage processing unit 810 of the RF tag 8 sends response information indicating a successful writing back to the reader/writer 3.

If the response information indicating a successful writing is not received within, for example, a predetermined time period, the writing result is determined as failed ("Failed" in S14) and the writing processing in S12 is retried ("NO" in S16). If the response information indicating a successful writing is received within the predetermined time period ("Successful" in S14), the procedure advances to S30. In the case of a successful writing, the restoration data generated in the backup processing in S10 is preferably deleted from the restoration information 360 (S15).

If the number of retries exceeds an acceptable value ("YES" in S16), the notification unit 306 notifies the host device 1 of a data loss (S18). Specifically, error information indicating that writing has failed due to a communication error and there is the possibility of a data loss is sent back to the host device 1 as a writing result. Here, the error information may include the restoration data generated by the backup processing in S10. The operation of the host device 1 that has received the error information will be described later as error notification processing.

In S22, the writing processing unit 305 writes new data into a normal block by, for example, a well-known method. Also in this case, if the response information indicating a successful writing is not received from the RF tag 8 within, for example, a predetermined time period, the writing result is determined as failed ("Failed" in S24) and the writing processing in S22 is retried ("NO" in S26). If the response information indicating a successful writing is received within the predetermined time period ("Successful" in S24), the procedure advances to S30.

If the number of retries exceeds an acceptable value ("YES" in S26), the notification unit 306 notifies the host device 1 of a writing failure due to a communication error (S28). Specifically, error information indicating that writing has failed due to a communication error is sent back to the host device 1, as a writing result.

In S30, the control unit 31 determines whether or not writing is completed. That is, it is determined whether or not the writing processes with respect to all blocks to which the writing range belongs are completed. If the writing is not completed ("NO" in S30), the procedure returns to S6, and the above-described processing is repeated. If the writing is completed ("YES" in S30), a writing result indicating the successful writing is sent back to the host device 1, and the series of data writing processing end.

Error Notification Processing

Figure 9:
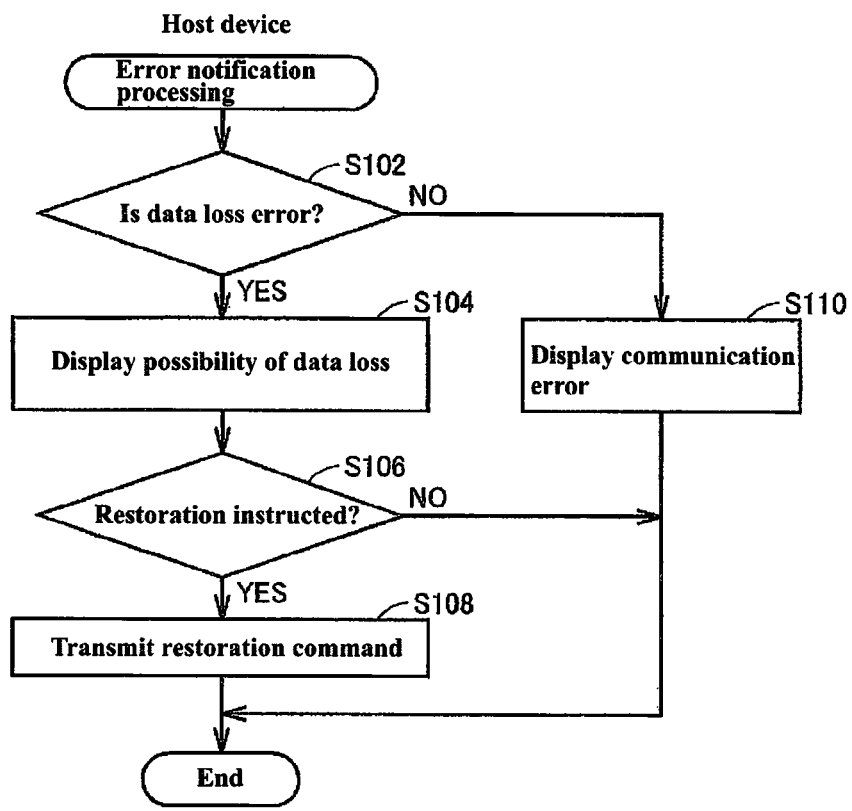
FIG. 9 is a flowchart illustrating error notification processing that is executed in the host device according to the embodiment of the present invention.

FIG. 9 is a flowchart illustrating error notification processing that is executed in the host device 1 according to the embodiment of the present invention. Note that the processing procedure shown in FIG. 9 is stored in advance as a program in, for example, the hard disk 15, and the data notification processing is realized by the CPU 10 reading and executing the program. Furthermore, the data notification processing starts when error information is received as a writing result from the reader/writer 3.

As shown in FIG. 9, the CPU 10 determines whether or not the received error information is a data loss error (S102). If the received error information is a simple communication error ("NO" in S102), a writing failure due to a communication error is displayed on the display unit 14 (S110).

On the other hand, if the received error information is a data loss error ("YES" in S102), the CPU 10 displays, on the display unit 14, a writing failure due to a communication error and the possibility of a data loss (S104). If the error information includes the restoration data, the communication time and date, the tag ID, the address information, and the original data may be displayed in association with that restoration data. Furthermore, a table as shown in FIG. 7 that includes previous restoration data may be displayed. A restoration button for accepting a restoration instruction may further be displayed on the display unit 14.

If a restoration instruction is input by operation of the operation unit 13 ("YES" in S106), the CPU 10 transmits a restoration command to the reader/writer 3 that has transmitted the error information (S108). In the present embodiment, because the user is notified that the data loss was caused due to a communication error, the user can give the restoration instruction after he or she performed a correction of the position of the RF tag 8. Therefore, in the restoration processing, which will be described later, it is possible to appropriately restore the erased data. Note that if previous restoration information is displayed together, it is assumed that the user selects the data to be restored and then inputs the restoration instruction. In this case, the restoration command includes information (for example, the communication time and date) for specifying the target restoration data (backup data).

The operation of the reader/writer 3 that has received the restoration command will be described hereinafter as restoration processing.

Restoration Processing

Figure 10:
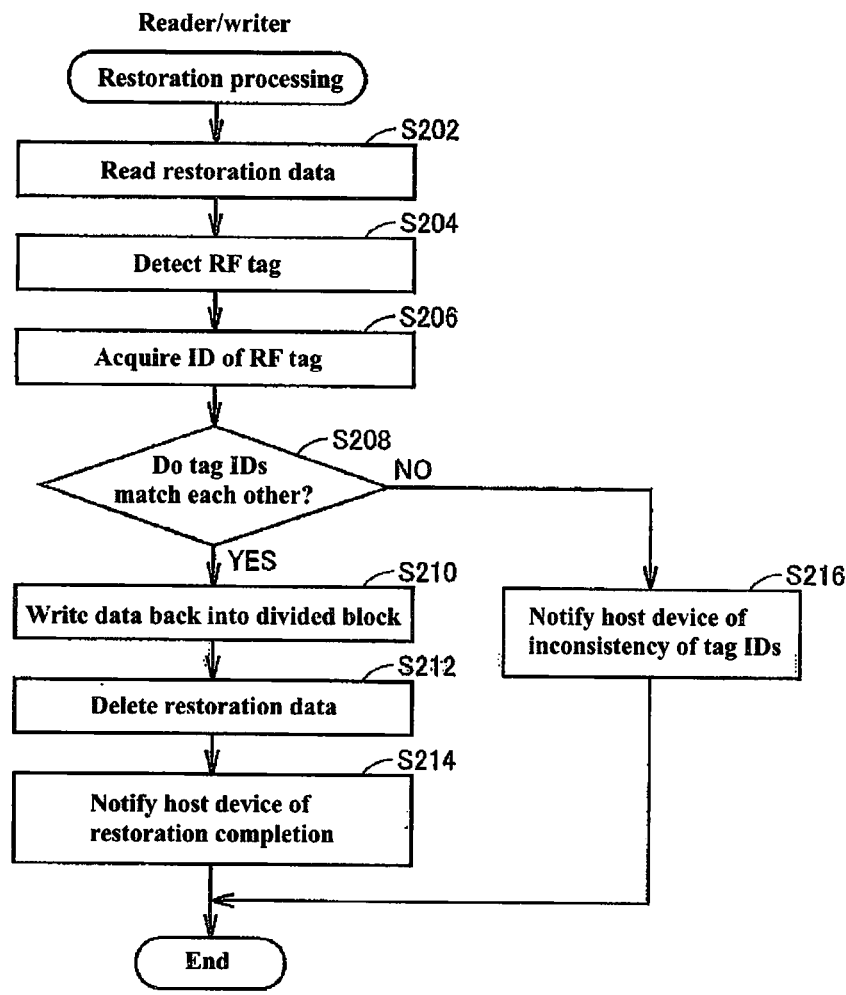
FIG. 10 is a flowchart illustrating restoration processing that is executed by the reader/writer according to the embodiment of the present invention.

FIG. 10 is a flowchart illustrating restoration processing that is executed by the reader/writer 3 according to the embodiment of the present invention. Note that the processing procedure shown in FIG. 10 is stored in advance as a program in the storage unit 36, and the restoration processing is realized by the control unit 31 reading and executing the program. Furthermore, the restoration processing starts when the restoration command from the host device 1 is received by the command receiving unit 301.

As shown in FIG. 10, the writing-back processing unit 307 first reads the restoration data that corresponds to the restoration command from the restoration information 360 of the storage unit 36 (S202). That is, the tag ID of the RF tag 8 that is to be restored, the original data, and the address information of the original data are read out. Note that if the restoration command includes no information for specifying the restoration data, for example, the latest restoration data may be read out among the restoration information 360.

Then, the detection processing unit 302 executes processing for detecting the RF tag 8 (S204). Upon detection of the RF tag 8, the tag ID thereof is acquired (S206). The writing-back processing unit 307 determines whether or not the acquired tag ID and the read tag ID correspond to each other (S208). If they correspond to each other ("YES" in S208), the read original data is written back into the block that was specified based on the read address information (S210). Accordingly, it is possible to completely restore the data of a divided block whose data outside the writing range is lost. If data is written back, the restoration data that was written back is deleted from the restoration information 360 (S212).

When the writing-back of the original data is completed, the notification unit 306 notifies the host device 1 of the completion of the restoration (S214). The host device 1 that was notified of the completion of the restoration displays this on the display unit 14, and preferably deletes the restoration data used for the restoration if the restoration information is held also in the hard disk 15.

Furthermore, by the host device 1 that was notified of the completion of the restoration transmitting again a writing command to the reader/writer 3, it is possible to execute again the data writing processing shown in FIG. 8. As a result, it is possible to appropriately write the update data (original data and new data) into the RF tag 8.

If it is determined in S208 that tag IDs do not match each other ("NO" in S208), the notification unit 306 notifies the host device 1 of the inconsistency of the tag IDs (S216).

Note that also in the writing-back processing in S210, as with in the data writing processing shown in FIG. 8, an acceptable number of retries may be provided, and if the number of retries exceeds an acceptable number, the host device 1 may be notified of a restoration failure.

As described above, according to the present embodiment, the original data of a divided block is backed up in the reader/writer 3, and thus even if an unintended data loss occurs, a user can write the original data back into the flash memory 82 only by inputting a restoration instruction to the host device 1. Therefore, it is possible to prevent a complete data loss by a simple method without changing the hardware configuration of the RF tag 8 or the environment of the system.

Note that a method in which data of all blocks to which a writing range belongs is read in advance and backed up is also conceivable as another handling method on the application side. However, when the writing range is large, such a method is inefficient because it takes a lot of trouble with reading. In contrast, according to the present embodiment, only divided blocks serve as backup targets and reading processing that is performed in a well-known writing processing is used, and thus it is possible to efficiently back up the data that may be going to be erased.

Modification

While the above-described embodiment relates to how to deal with a data loss when communication is interrupted during writing of data into a divided block, the present modification can also address a data loss when a momentary power interruption of the reader/writer 3 occurs. Momentary power interruption refers to the case where the electric power supply is temporarily interrupted during the operation of the reader/writer 3.

In the present modification, the storage unit 36 holds predetermined information while writing processing with respect to a divided block in the reader/writer 3 is performed by the writing processing unit 305. The predetermined information refers to information indicating that writing into a divided block is in progress (the reading is completed). In the present modification, by, for example, turning a writing flag of the storage unit 36 ON, the information indicating that writing into a divided block is in progress is stored in a nonvolatile manner. Data writing processing using the writing flag will be described with reference to FIG. 11.

Figure 11:
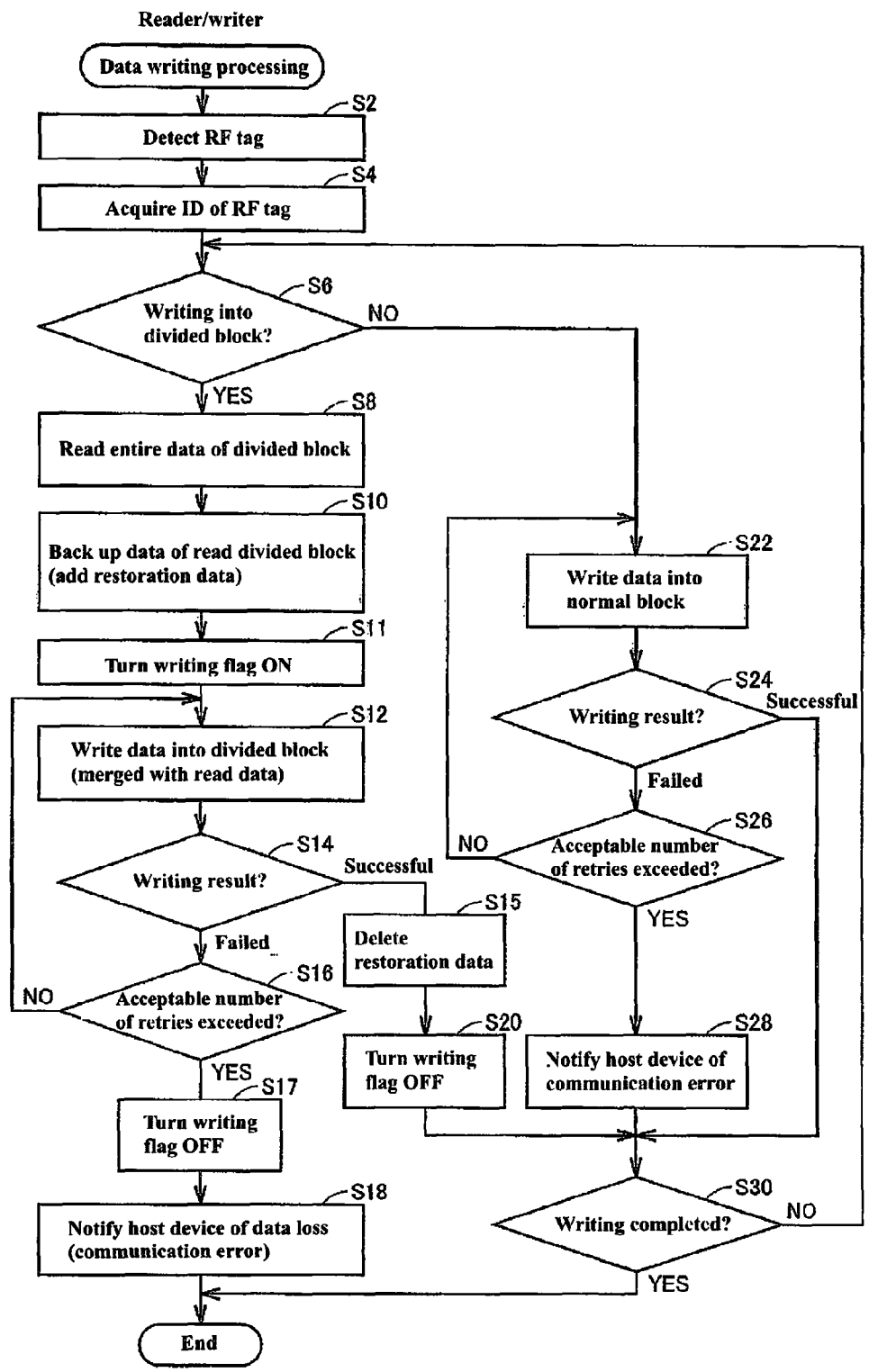
FIG. 11 is a flowchart illustrating data writing processing that is executed by a reader/writer, according to a modification of the embodiment of the present invention.

FIG. 11 is a flowchart illustrating data writing processing that is executed by the reader/writer 3, according to the modification of the embodiment of the present invention. In FIG. 11, the same step numbers are given to the same processes as those shown in FIG. 8. Therefore, descriptions thereof are not repeated.

As shown in FIG. 11, in the present modification, new S11 is added between S10 (backup processing) and S12 (writing processing) that are shown in FIG. 8. In S11, the control unit 31 turns the writing flag ON. Note that in the present modification, the writing flag is set to OFF at the start of the data writing processing.

Furthermore, new S20 is added between S15 (restoration data deletion) and S30 (determination of the writing end) that are shown in FIG. 8. In S20, the control unit 31 turns the writing flag OFF. Furthermore, new S17 is added between S16 (the number of retries exceeding an acceptable value) and S18 (notification of a data loss) of FIG. 8. Also in S17, the control unit 31 turns the writing flag OFF.

Accordingly, in the present embodiment, the writing flag is set to ON only during the writing of data into a divided block (S12, S14, and S16). Therefore, if a momentary power interruption of the reader/writer 3 occurs during the writing, the writing flag of the storage unit 36 will remain in the ON state.

The following will describe processing for starting reader/writer 3 when an electric power is again supplied after the momentary power interruption.

Figure 12:
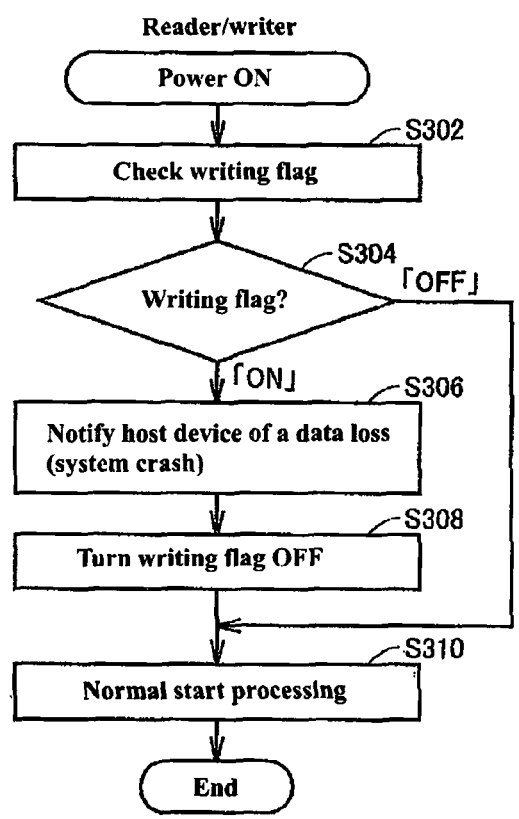
FIG. 12 is a flowchart illustrating processing for starting the reader/writer according to the modification of the embodiment of the present invention.

FIG. 12 is a flowchart illustrating processing for starting the reader/writer 3 according to the modification of the embodiment of the present invention. Note that the processing shown in FIG. 12 as well is stored in advance as a program in the storage unit 36, and the start processing is realized by the control unit 31 reading and executing the program.

As shown in FIG. 12, the control unit 31 first checks the writing flag of the storage unit 36 (S302). If the writing flag is set to OFF ("OFF" in S304), the procedure advances to normal start processing (S310). Whereas, if the writing flag is set to ON ("ON" in S304), the host device 1 is notified of a data loss (S306). Here, error information indicating a writing failure due to a system crash and the possibility of a data loss is sent back as a writing result to the host device 1. Then, the writing flag is turned OFF (S308), and the procedure advances to the normal start processing (S310).

Up on reception of the error information notified in S306, the host device 1 displays, on the display unit 14, the possibility of a data loss and a writing failure due to a system crash. When previous restoration information as well is displayed on the display unit 14, it is preferable to display the respective pieces of original data such that they are distinguished as to whether it is data lost by a communication error or data lost by a system crash.

In the foregoing embodiment and its modification, it is also possible to provide the processes (data writing method and the like) shown in the respective flowcharts as programs. Such programs can be provided in the state of being recorded in an optical medium such as a CD-ROM or non-transitory computer-readable recording medium such as a memory card. Furthermore, the programs can be provided by downloading via a network.

The programs (data writing program and the like) that are executed in the reader/writer 3 can be transmitted, for example, from the host device 1 via the communication I/F 35, and the reader/writer 3 can update the program stored in the storage unit 36 with a received program.

Note that a program according to the present invention may be such that, of program modules provided as a part of an operating system (OS) of the computer, required modules are called in a predetermined arrangement at a predetermined timing and the called modules execute the processing. In this case, the program itself does not include the above-described modules, and the processing is performed in cooperation with the OS. A program that does not include such modules can be included in the program according to the present invention.

Furthermore, a program according to the present invention may be provided in the state of being incorporated into a part of another program. Also in this case, the program itself does not include the modules that are included in the other program, and processing is executed in cooperation with the other program. Such a program that is incorporated into another program can also be included in the program according to the present invention.

The embodiments disclosed here are in all respects exemplary and are not construed as restrictive. The scope of the present invention is indicated not by the description above but rather by the Claims, and encompasses all modifications in the meaning and scope equivalent to the Claims.

INDEX TO THE REFERENCE NUMERALS

1 ... Host device, 2 ... Hub, 3 ... RF tag, 8 ... RF tag, 10 ... CPU, 11 ... ROM, 12 ... RAM, 13 ... Operation unit, 14 ... Display unit, 15 ... Hard disk, 16, 35 ... Communication I/F, 17 ... Drive device, 30 ... Communication control device, 31, 81 ... Control unit, 32 ... Transmitting circuit, 33 ... Receiving circuit, 34 ... Reception level detecting circuit, 36 ... Storage unit, 37 ... Timer unit, 38 ... Display unit, 39 ... Electric power supply unit, 70 ... Antenna unit, 71 ... Antenna coil, 80 ... Wireless communication IC, 82 ... Flash memory, 83 ... Wireless processing unit, 84 ... Electric power supply unit, 90 ... Antenna unit, 301 ... Command receiving unit, 302 ... Detection processing unit, 303 ... Specifying unit, 304 ... Backup processing unit, 305 ... Writing processing unit, 306 ... Notification unit, 360 ... Restoration information, 810 ... Storage processing unit, SYS ... RFID system

The invention claimed is:

1. A communication device that performs contactless communication with an RF tag that is provided with a nonvolatile memory having a plurality of blocks serving as units of data erasure of original data to be initialized by data erasure before update data is to be written thereto, the communication device comprising:
a specifying unit that specifies, from among the plurality of blocks that include a writing range of the update data, a block that includes the original data that is outside the writing range of the update data when the update data is written into the nonvolatile memory;
a backup processing unit that backs up the original data of the block specified by the specifying unit;
a storage unit that stores backup data that includes the original data; and
a writing processing unit that writes, when the backup data is stored in the storage unit, the update data into the block that was specified and initialized.

2. The communication device according to claim 1, wherein the original data included in the backup data is data that is read by the writing processing unit from the specified block before the initialization.

3. The communication device according to claim 1, further comprising:
a writing-back processing unit that reads the backup data stored in the storage unit and writes the original data back into the specified block of the nonvolatile memory, if writing into the specified block has failed.

4. The communication device according to claim 3, further comprising:
a notification unit that performs, if writing into the specified block has failed, notification of error information indicating a possibility of a data loss,
wherein the writing-back processing unit writes the original data back into the specified block in response to a writing-back instruction from a user.

5. The communication device according to claim 4, further comprising:
an electric power supply unit,
wherein the storage unit further stores predetermined information during writing processing by the writing processing unit,
the notification unit further performs, when the electric power supply unit is turned on, notification of the error information if the predetermined information is stored in the storage unit.

6. The communication device according to claim 5, wherein the notification unit performs notification of the error information such that a data loss caused by a communication failure and a data loss caused by an electric power interruption are distinguished from each other.

7. The communication device according to claim 4, wherein the notification unit transmits the error information to a host device connected by a cable or wireless connection.

8. The communication device according to claim 3, further comprising:
a detection unit that detects the RF tag, and acquires identification information of the detected RF tag,
wherein the backup processing unit stores the identification information of the RF tag and the backup data in association with each other, and
the writing-back processing unit writes the original data back into the specified block in response to a writing-back instruction, if the identification information of the detected RF tag and the identification information associated with the backup data match each other.

9. An RFID system comprising:
a communication device that performs contactless communication with an RF tag that is provided with a nonvolatile memory having a plurality of blocks serving as units of data erasure of original data to be initialized by data erasure before update data is to be written thereto, the communication device comprising: a specifying unit that specifies, from among the plurality of blocks that include a writing range of the update data, a block that includes the original data that is outside the writing range of the update data when the update data is written into the nonvolatile memory; a backup processing unit that backs up the original data of the block specified by the specifying unit; a storage unit that stores backup data that includes the original data; and a writing processing unit that writes, when the backup data is stored in the storage unit, the update data into the block that was specified and initialized; and
the RF tag.

10. The RFID system according to claim 9, wherein the original data included in the backup data is data that is read by the writing processing unit from the specified block before the initialization.

11. The RFID system according to claim 9, wherein the communication device further comprises:
a writing-back processing unit that reads the backup data stored in the storage unit and writes the original data back into the specified block of the nonvolatile memory, if writing into the specified block has failed.

12. The RFID system according to claim 11, wherein the communication device further comprises:
a notification unit that performs, if writing into the specified block has failed, notification of error information indicating a possibility of a data loss,
wherein the writing-back processing unit writes the original data back into the specified block in response to a writing-back instruction from a user.

13. The RFID system according to claim 12, wherein the communication device further comprises:
an electric power supply unit,
wherein the storage unit further stores predetermined information during writing processing by the writing processing unit, the notification unit further performs, when the electric power supply unit is turned on, notification of the error information if the predetermined information is stored in the storage unit.

14. The RFID system according to claim 13, wherein the notification unit performs notification of the error information such that a data loss caused by a communication failure and a data loss caused by an electric power interruption are distinguished from each other.

15. The RFID system according to claim 12, wherein the notification unit transmits the error information to a host device connected by a cable or wireless connection.

16. The RFID system according to claim 11, wherein the communication device further comprises:
   a detection unit that detects the RF tag, and acquires identification information of the detected RF tag,
   wherein the backup processing unit stores the identification information of the RF tag and the backup data in association with each other, and
   the writing-back processing unit writes the original data back into the specified block in response to a writing-back instruction, if the identification information of the detected RF tag and the identification information associated with the backup data match each other.

17. A recording medium having a data writing program for writing data into a nonvolatile memory of an RF tag recorded thereon, the nonvolatile memory having a plurality of blocks serving as units of data erasure of original data to be initialized by data erasure before update data is to be written thereto, the data writing program being executed by a communication device that performs contactless communication with the RF tag, the data writing program causing a processor of the communication device to perform operations comprising:
   specifying, from among the plurality of blocks that include a writing range of the update data, a block that includes the original data that is outside the writing range of the update data when the update data is written into the nonvolatile memory;
   storing backup data that includes the original data of the specified block into a storage unit; and
   writing, when the backup data is stored in the storage unit, the update data into the block that was specified and initialized.

18. The recording medium according to claim 17, wherein the data writing program causes the processor of the communication device to perform operations further comprising:
   reading the backup data stored in the storage unit and writing the original data back into the specified block of the nonvolatile memory, if writing into the specified block has failed.

19. The recording medium according to claim 18, wherein the data writing program causes the processor of the communication device to perform operations further comprising:
   if writing into the specified block has failed, providing a notification of error information indicating a possibility of a data loss, and
   writing the original data back into the specified block in response to receiving a writing-back instruction.

20. The recording medium according to claim 18, wherein the data writing program causes the processor of the communication device to perform operations further comprising:
   detecting the RF tag,
   acquiring identification information of the detected RF tag,
   storing the identification information of the RF tag and the backup data in association with each other, and
   writing the original data back into the specified block in response to a writing-back instruction, if the identification information of the detected RF tag and the identification information associated with the backup data match each other.

* * * * *